US009203704B2

(12) United States Patent
Mathews et al.

(10) Patent No.: US 9,203,704 B2
(45) Date of Patent: Dec. 1, 2015

(54) DISCOVERING A SERVER DEVICE, BY A NON-DLNA DEVICE, WITHIN A HOME NETWORK

(75) Inventors: Robin M. Mathews, Westford, MA (US); Michael Talbert, Nazareth, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 725 days.

(21) Appl. No.: 13/214,555

(22) Filed: Aug. 22, 2011

(65) Prior Publication Data

US 2013/0054829 A1   Feb. 28, 2013

(51) Int. Cl.
| H04L 12/24 | (2006.01) |
| H04L 12/28 | (2006.01) |
| G06F 17/30 | (2006.01) |
| H04L 12/46 | (2006.01) |

(52) U.S. Cl.
CPC .......... H04L 41/12 (2013.01); G06F 17/30867 (2013.01); H04L 12/2809 (2013.01); H04L 12/4625 (2013.01)

(58) Field of Classification Search
None
See application file for complete search history.

(56) References Cited

U.S. PATENT DOCUMENTS

| 6,480,508 | B1 * | 11/2002 | Mwikalo et al. | 370/475 |
| 7,720,997 | B1 * | 5/2010 | Gourlay et al. | 709/245 |
| 7,724,688 | B2 * | 5/2010 | Yamada et al. | 370/256 |
| 7,827,275 | B2 * | 11/2010 | Kanaparti et al. | 709/224 |
| 7,962,569 | B2 * | 6/2011 | Sewall et al. | 709/217 |
| 8,054,211 | B2 * | 11/2011 | Vidal | 341/176 |
| 8,616,978 | B2 * | 12/2013 | Gagner et al. | 463/42 |
| 8,631,137 | B2 * | 1/2014 | Douillet et al. | 709/228 |
| 2004/0215823 | A1 * | 10/2004 | Kleinfelter et al. | 709/245 |
| 2004/0250124 | A1 * | 12/2004 | Chesla et al. | 713/201 |
| 2005/0182815 | A1 * | 8/2005 | Offredo et al. | 709/200 |
| 2007/0237159 | A1 * | 10/2007 | Yamada et al. | 370/395.53 |
| 2007/0255848 | A1 * | 11/2007 | Sewall et al. | 709/232 |
| 2007/0288632 | A1 * | 12/2007 | Kanaparti et al. | 709/224 |
| 2008/0031136 | A1 * | 2/2008 | Gavette et al. | 370/235 |
| 2009/0100492 | A1 * | 4/2009 | Hicks et al. | 725/127 |
| 2009/0268754 | A1 * | 10/2009 | Palm et al. | 370/466 |
| 2010/0023601 | A1 * | 1/2010 | Lewin et al. | 709/218 |
| 2010/0250776 | A1 * | 9/2010 | Lev | 709/238 |
| 2012/0201186 | A1 * | 8/2012 | Awano | 370/312 |

* cited by examiner

*Primary Examiner* — Ninos Donabed

(57) ABSTRACT

A router is configured to receive a message from a server device, store information about the server device based on the message, and receive a request from a client device. The request includes an address associated with the server device. The local router is further configured to map the address to the information and transmitting a response to the client device. The response indicates the mapping of the address to the information. The local router, the server device, and the client device are within a single local area network (LAN). The information allows the client device to detect a presence of the server device without the request being transmitted external to the LAN.

19 Claims, 5 Drawing Sheets

| FIXED URL 310 | IP ADDRESS 320 | | |
|---|---|---|---|
| myniceserver.localhome.net | 192.168.124.124 | | |

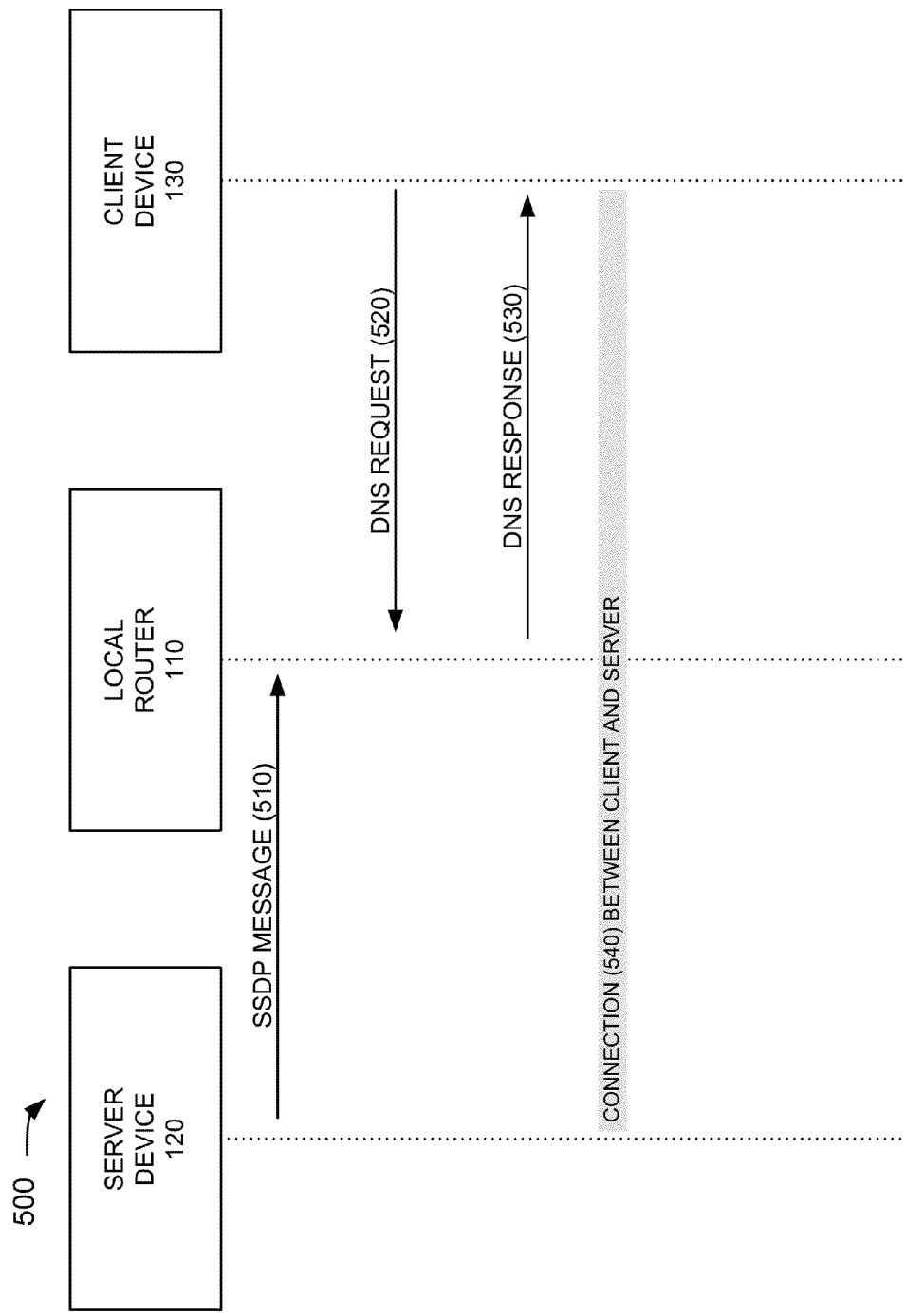

DISCOVERING A SERVER DEVICE, BY A NON-DLNA DEVICE, WITHIN A HOME NETWORK

BACKGROUND

Some in-home client devices include a Digital Living Network Alliance (DLNA) component. A DLNA component provides a mechanism to allow a client device to use the Simple Service Discovery Protocol (SSDP) to discover a presence of a server device within a home network that includes the client device and the server device. However, a DLNA component relies on an evolving standard and requires additional overhead (e.g., computing resources, expenses, etc.). For these and/or other reasons, some manufacturers of client devices, with Internet connectivity, do not include DLNA components in the client devices. As a result, a client device that does not have a DLNA component also does not have SSDP discovery capabilities used for discovering a presence of a server device within a home network.

BRIEF DESCRIPTION OF THE DRAWINGS

FIG. 3 is a diagram of example information stored for server devices by a local router of FIG. 1;

FIG. 5 is a flow diagram of an example of a client device discovering the presence of a server device within the home network.

DETAILED DESCRIPTION OF PREFERRED EMBODIMENTS

The following detailed description refers to the accompanying drawings. The same reference numbers in different drawings may identify the same or similar elements An implementation, described herein, may provide a mechanism for allowing a client device that does not have Digital Living Network Alliance (DLNA) capabilities (i.e., does not have a DLNA component) (referred to as a non-DLNA client device) to discover a presence of a server device within a home network that includes the non-DLNA client device and the server device. For example, a server device, within a home network, may advertise its own presence by using the Simple Service Discovery Protocol (SSDP). As a result of the advertising, a local router, of the home network, may receive an SSDP message from the server device. The SSDP message may include an Internet protocol (IP) address of the server device and a Uniform Resource Locator (URL) associated with the server device. The local router may store information about the server device, including the IP address and the URL. Additionally, the local router may use the SSDP information to update its dynamic database of services that are no longer available.

Thereafter, a non-DLNA client device, within the home network, may boot-up and transmit a Domain Name System (DNS) request that includes a hardcoded URL. The local router may trap the DNS request, and may determine that the hardcoded URL is associated with the server device. In response to the DNS request, the local router may transmit the IP address of the server device to the non-DLNA client device. The non-DLNA client device may use the IP address to establish a connection with the server device. Accordingly, the non-DLNA client device is able to discover the presence of the server device within the home network (i.e., without transmitting DNS requests via a network (e.g., a wide area network (WAN)) outside the home network).

Figure 1:
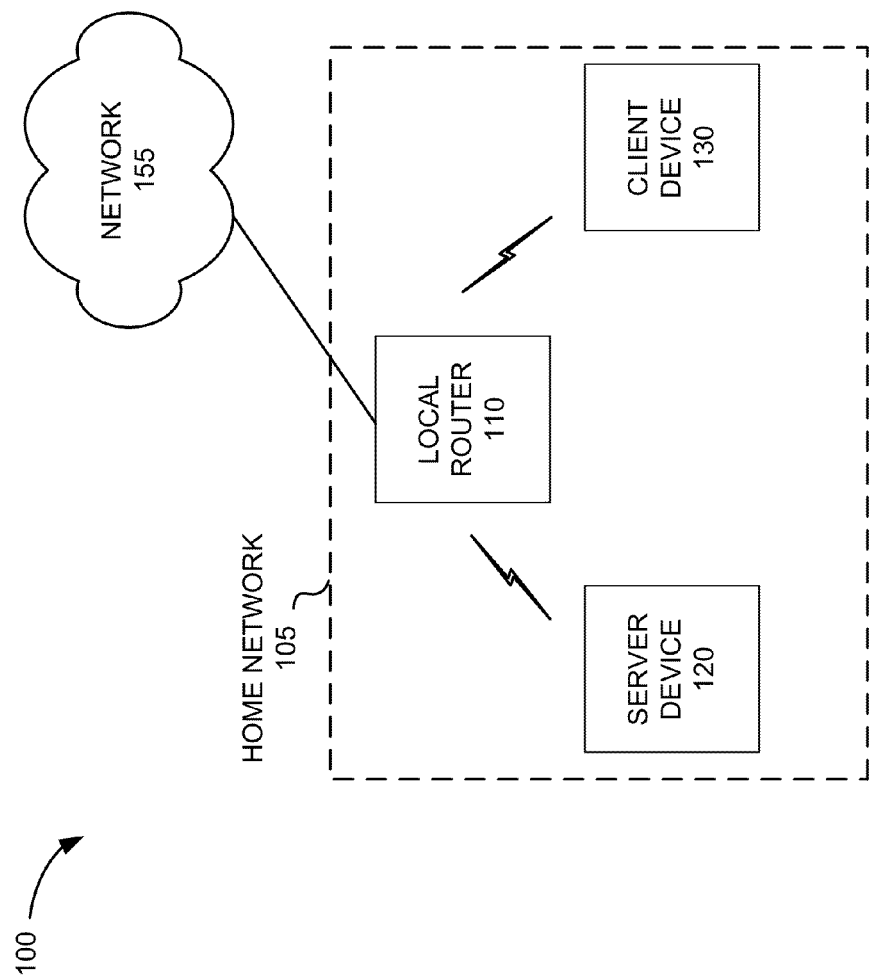
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include a home network 105 and a network 155. Home network 105 may include a local router 110, a server device 120, and a client device 130. Components of environment 100 may interconnect via wired and/or wireless connections or links.

A single home network 105, local router 110, server device 120, client device 130, and network 155 have been illustrated in FIG. 1 for simplicity. In practice, there may be additional home networks 105, local routers 110, server devices 120, client devices 130, and/or networks 155. In other implementations, environment 100 may include fewer elements, different elements, differently arranged elements, and/or additional elements than those depicted in FIG. 1. Additionally or alternatively, one or more elements of environment 100 may perform the tasks described as being performed by one or more other elements of environment 100.

Home network 105 may represent a residential local area network (LAN). Home network 105 may include one or more devices connected to each other, and/or network 155. Devices in home network 105 may include, for example, one or more local routers (e.g., local routers 110), server devices (e.g., server device 120), and/or client devices (e.g., client device 130). Home network 105 may also include other networking equipment and/or devices, such as additional media storage devices, a local gateway, cables, splitters, etc. (not shown). Home network 105 may be located within a particular residence, office, building, etc.

Local router 110 may include a device that acts as an access point to network 155. Local router 110 may act as a wireless access point that employs one or more short-range wireless communication protocols for a wireless local area network (WLAN) and/or a wireless personal area network (WPAN), a wired access point, or a combination of a wireless and wired access point. In one implementation, local router 110 may use an IEEE 802.11g/n (e.g., Wi-Fi) protocol and/or an IEEE 802.15 (e.g., Bluetooth) protocol. In another implementation, local router 110 may use a different short-range wireless protocol and/or a different set of frequencies. Local router 110 may provide connectivity between equipment within home network 105 and between home network 105 and an external network (e.g., network 155), and may also include one or more wired (e.g., Ethernet, TIA Cat 3 cable, etc.) connections.

Local router 110 may use ports for the Transmission Control Protocol (TCP) and/or the User Datagram Protocol (UDP), including UDP port number 53. Local router 110 may also store information about one or more server devices (e.g., server device 120) that are within home network 105, as described further below with reference to FIG. 3. For example, local router 110 may receive an SSDP message from server device 120. Local router 110 may store an IP address, of server device 120, that is included in the SSDP message. Thereafter, local router 110 may receive, from client device 130, a DNS request that includes a hardcoded URL. Local router 110 may trap the DNS request in UDP port 53. In response to the DNS request, local router 110 may transmit the IP address of server device 120 to client device 130.

Server device 120 may include any computation or communication device that is capable of providing a service to client device 130. Server device 120 may represent a single server device or a collection of multiple server devices and/or computer systems associated with a particular IP address. In one example, server device 120 may store and/or have access to data (e.g., video content). Server device 120 may provide the data in response to requests from client devices (e.g., client device 130). In another example, server device 120 may execute a particular application. Server device 120 may use the particular application to handle the processing of requests from client devices (e.g., client device 130). Server device 120 may advertise its presence by using the SSDP. To do so, server device 120 may transmit SSDP messages, which include an IP address of server device 120, throughout home network 105.

Client device 130 may include any computation or communication device, such as a communication device that is capable of communicating via home network 105. Client device 130 may take the form of any computer device, such as, for example, a web service terminal, a personal computer, a laptop, a handheld computer, a smart phone, a mobile telephone device, a personal media player, a set-top-box and/or display device with Internet connectivity, etc. Client device 130 may store a hardcoded URL (e.g., myniceserver.localhome.net). An application, associated with server device 120, may be installed on client device 130. The application may include the hardcoded URL, which is associated with server device 120.

Client device 130 may transmit a DNS message with the hardcoded URL. Local router 110 may receive the DNS message. In response to the DNS message, client device 130 may receive an IP address of server device 120. Based on the IP address, client device 130 may detect a presence of server device 120 and/or establish a connection with server device 120 via local router 110. Client device 120 may receive a service provided by server device 120 via the connection. In some implementation, server device 120 may operate as a server device and a client device and/or client device 130 may operate as a server device and a client device.

Network 155 may include a network that is outside of home network 105 and is connected to home network 105 via local router 110 or another device (not shown). Network 155 may include a single network, multiple networks of a same type, or multiple networks of different types. For example, network 155 may include a LAN, a WAN (e.g., the Internet), a metropolitan area network (MAN), a wireless network (e.g., a general packet radio service (GPRS) network), a telephone network (e.g., a Public Switched Telephone Network (PSTN) or a cellular network), a subset of the Internet, an ad hoc network, a fiber optic network (e.g., a fiber optic service (FiOS) network), or any combination of the aforementioned networks. Network 155 may further include transport and/or network devices, such as routers, switches, and/or firewalls. In an implementation described herein, network 155 may not receive any DNS requests from client device 130 when client device 130 is discovering a presence of server device 120 within home network 105. In other words, local router 110 resolves the DNS request without transmitting the DNS request to network 155. Network 155 may receive a DNS request, from local router 110, when the DNS request includes a URL that is not associated with any server within home network 105.

Figure 2:
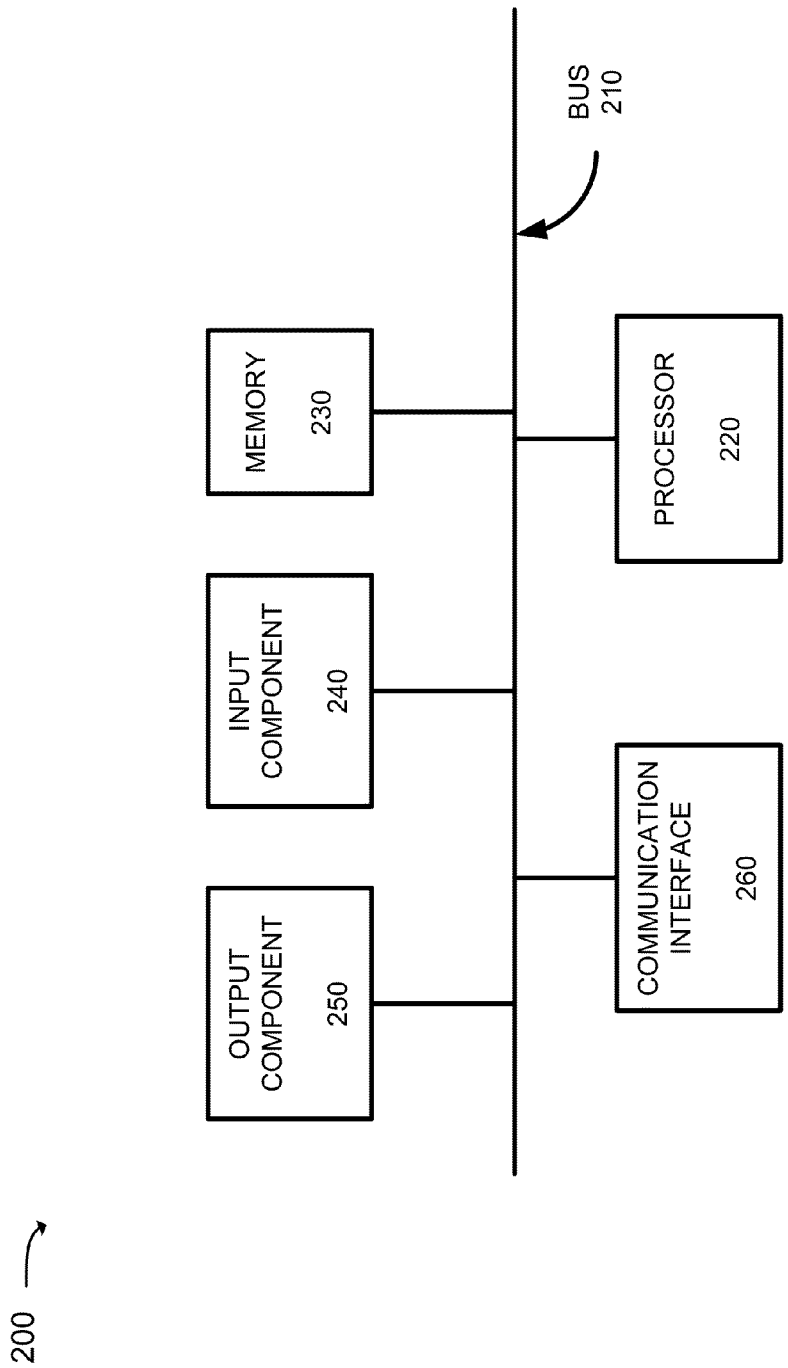
FIG. 2 is a diagram of example components of one or more of the devices of FIG. 1.

FIG. 2 is a diagram of example components of a device 200 that may correspond to local router 110, server device 120, or client device 130. Each of local router 110, server device 120, and client device 130 may include one or more devices 200 or a portion of device 200.

As shown in FIG. 2, device 200 may include a bus 210, a processor 220, a memory 230, an input component 240, an output component 250, and a communication interface 260. In another implementation, device 200 may include additional components, fewer components, different components, and/or differently arranged components than are shown in FIG. 2. Additionally, or alternatively, one or more components of device 200 may perform one or more tasks described as being performed by one or more other components of device 200.

Bus 210 may include a path, or a collection of paths, that permits communication among the components of device 200. Processor 220 may include a processor, microprocessor, or processing logic that may interpret and execute instructions. Memory 230 may include any type of dynamic storage device that may store information and instructions for execution by processor 220, and/or any type of non-volatile storage device that may store information for use by processor 220.

Input component 240 may include one or more input mechanisms that permit a user to input information to device 200. Output component 250 may include one or more output mechanisms that output information to the user. Examples of input and output mechanisms may include buttons; a touch screen interface to permit data and control commands to be input into device 200; a speaker to receive electrical signals and output audio signals; a microphone to receive audio signals and output electrical signals; a display to output visual information (e.g., web pages, product information, etc.); etc.

Communication interface 260 may include any transceiver-like mechanism that enables device 200 to communicate with other devices and/or systems. For example, communication interface 260 may include an Ethernet interface, an optical interface, a coaxial interface, a wireless interface, or the like.

Device 200 may perform certain operations described herein. Device 200 may perform these operations in response to processor 220 executing software instructions (e.g., computer program(s)) contained in a computer-readable medium, such as memory 230, a secondary storage device (e.g., a hard disk, etc.), or other forms of random access memory (RAM) or read only memory (ROM). A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

FIG. 3 is a diagram of an example data store 300 that stores information about server devices. As shown in FIG. 3, data store 300 may include a fixed URL field 310 and an IP address field 320. In practice, data store 300 may include additional fields, fewer fields, and/or different fields than are shown in FIG. 3. Data store 300 may represent a dynamic database, a text file, a linked list, a table, and/or any other collection of data. Local router 110 may store, maintain, and/or update data store 300.

Fixed URL field 310 may include a URL (e.g., myniceserver.localhome.net) that corresponds to a server device (e.g., server device 120) within home network 105. Client device 130 may store the URL as a fixed hardcore URL, and may include the URL in a DNS request that client device 130 sends to local router 110.

IP address field 320 may include an IP address (e.g., 192.168.124.124) of server device 120. For example, server device 120 may include the URL and the IP address in an SSDP message when server device 120 advertises its presence within home network 105. Local router 110 may receive the SSDP message, and may store information about server device 120 by adding the URL to fixed URL field 310 and by adding the IP address to IP address field 320.

When local router 110 later receives a DNS request from client device 130, local router 110 may map the URL (e.g., myniceserver.localhome.net), in fixed URL field 310, to the IP address (e.g., 192.168.124.124), in IP address field 320. Based on the mapping, local router 110 may transmit a response to client device 130 that indicates that the URL (e.g., myniceserver.localhome.net) is mapped to the IP address (e.g., 192.168.124.124).

Figure 4:
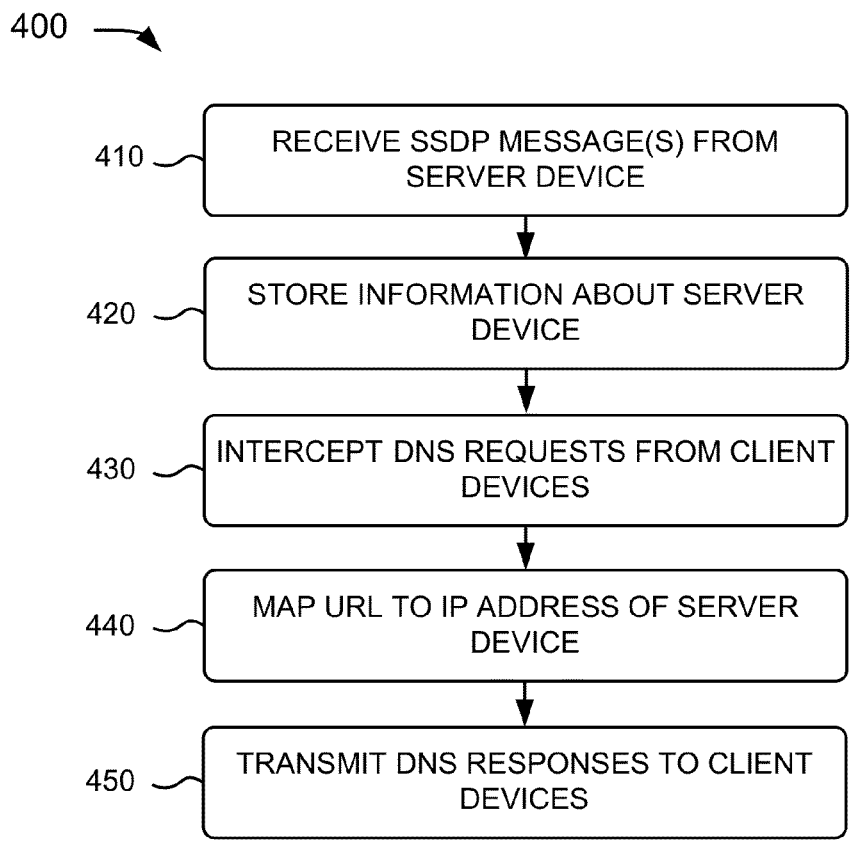
FIG. 4 is a flow chart of an example process for facilitating a discovery of a presence of a server device within a home network.

FIG. 4 is a flow chart of an example process 400 for facilitating a discovery of a presence of server device 120 within home network 105. In one example implementation, local router 110 may perform process 400. Alternatively, process 400 may be performed by one or more other devices, alone or in combination with local router 110. A portion of process 400 is described below in reference to FIG. 5.

As shown in FIG. 4, process 400 may include receiving SSDP message from server device 120 (block 410) and storing information about server device 120 (block 420). For example, assume that server device 120 is booted-up while located within home network 105. Server device 120 may use a DLNA protocol, such as SSDP, to advertise/announce that server device 120 is available (i.e., announce the presence of server device 120). When advertising, server device 120 may transmit SSDP messages, including an SSDP message 510 (FIG. 5), through home network 105 in the form of periodic broadcast messages. SSDP message 510 may include an IP address (e.g., 192.168.124.124) of server device 120, a port number, and/or a URL associated with server device 120. Local router 105 may intercept/receive SSDP message 510. Local router 105 may store information about server device 120 after determining that SSDP message 510 is an SSDP message. Server device 120 may determine that SSDP message 510 is an SSDP message when SSDP message 510 has a format defined by the SSDP (e.g., when SSDP message 510 includes a header that indicates that SSDP message 510 is an SSDP message). Storing the information about server device 120 may include, for example, storing the IP address and the URL included in SSDP message 510, in a data structure (e.g., in a dynamic database) that includes information about server devices within home network 105.

Process 400 may further include intercepting a DNS request from client device 130 (block 430), mapping a hostname to an IP address of server device 120 (block 440), and transmitting a response to client device 130 (block 450). For example, assume that client device 130, which does not have DLNA capabilities, is booted-up while located within home network 105. Client device 130 may receive and/or store a hardcoded URL (e.g., a fixed hardcoded URL (e.g., myniceserver.localhome.net)). For example, client device 130 may include a particular application. The particular application may be associated with server device 120 and may include the hardcoded URL, which is associated with server device 120.

Client device 130 may include the hardcoded URL in a DNS request 520 (FIG. 5) as a hostname, and may transmit DNS request 520 via home network 105 towards local router 110. Local router 110 may intercept DNS request 520 by trapping DNS request 520 in UDP port 53. Local router 110 may map the hardcoded URL of DNS request 520 to the IP address of server device 120. Thereafter, local router 110 may transmit a DNS response 530 (FIG. 3) to client device 130. DNS response 530 may indicate that the hardcoded URL is mapped to the IP address of server device 120.

In one implementation, local router 110 may trap DNS request 520 when local router 110 determines that DNS request 520 includes the URL, which is associated with a server device within home network 105. Local router 110 may transmit another DNS request, from client device 130, to an external network (e.g., network 155) when local router 110 determines that the other DNS request includes a URL that is not associated with any server within home network 105.

In another implementation, the URL may represent a proxy name for a server (e.g., server device 120) in home network 105. Local router 110 may determine whether DNS request 520 includes the proxy name. When DNS request 520 includes the proxy name, local router 110 may provide IP addresses of one or more servers (e.g., including server device 120) that are available within home network 105. DNS response 530 may include the IP addresses, including the IP address of server device 120 that is within home network 105.

As further shown in FIG. 5, client device 130 may receive DNS response 530 from local router 110. Client device 130 may not recognize that local router 110 responded with DNS response 530 instead of an external DNS server. Client device 130 may discover a presence of server device 120 based on DNS response 530. Thereafter, a connection 540 (FIG. 5) may be established between client device 130 and server device 120. Client device 130 may receive service(s) provided by server device 120 via connection 540.

According to an implementation described herein, client device 130, which does not have DLNA capabilities and is located within home network 105, may detect a presence of server device 120 that is also within home network 105. Local router 110 may intercept a DNS request from client device 130. Local router 110 may determine that the DNS request includes a URL associated with server device 120 within home network 105. Local router may map the URL to an IP address of server device 120. In response to the DNS request, local router 110 may transmit a DNS response, which includes the IP address, to client device 120. Client device 120 may discover a presence of server device 120 without transmitting DNS requests for server device 120 outside of home network 105.

As further shown in FIG. 4, local router 110 may continuously serve as an intermediary between one or more server devices, including server device 120, and one or more client devices, including client device 120. Accordingly, local router 110 may, for example, continuously, and/or simultaneously, receive multiple messages from the one or more server devices (block 420), intercept multiple DNS requests from multiple client devices (block 430), and transmit multiple DNS responses to the multiple client devices (block 450). For example, local router 110 may intercept DNS requests from two client devices while transmitting a DNS response to a third client device.

The foregoing description of implementations provides illustration and description, but is not intended to be exhaustive or to limit the possible implementations to the precise form disclosed. Modifications and variations are possible in light of the above teachings or may be acquired from practice.

For example, while a series of blocks has been described with regard to FIG. 4, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code-it being understood that software and control hardware could be designed to implement the aspects based on the description herein.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementations includes each dependent claim 1n combination with every other claim 1n the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a router, a message from a server device;
   storing, by the router, information about the server device based on the message;
   trapping, by the router, a request from a client device in a User Datagram Protocol (UDP) port number fifty-three of the router,
      the router, the server device, and the client device being within a single local area network (LAN),
      the client device not having Digital Living Network Alliance (DLNA) capabilities, and
      the request comprising an address associated with the server device;
   mapping, by the router, the address to the information; and
   transmitting, by the router, a response to the client device,
      the information allowing the client device within the single LAN to detect a presence of the server device within the single LAN by communicating with the router within the single LAN and without the request being transmitted external to the single LAN.

2. The method of claim 1, where the message is based on a Simple Service Discovery Protocol (SSDP).

3. The method of claim 1,
   where the message comprises an Internet protocol (IP) address of the server device, and
   where the information is the IP address.

4. The method of claim 1, where the request is a Domain Name System (DNS) request.

5. The method of claim 1, where mapping the address to the information comprises:
   determining whether the address matches a proxy name associated with local servers within the single LAN,
   retrieving one or more IP addresses associated with the local servers when the address matches the proxy name, where the IP addresses comprise an IP address of the server device, and
   including the IP addresses in the response.

6. A router comprising:
   a memory; and
   a processor to:
      receiving a message from a server device;
      store, based on the message and in the memory, a first address of the server device;
      intercept a request from a client device by trapping the request in a User Datagram Protocol (UDP) port number fifty-three of the router,
         the client device not having Digital Living Network Alliance (DLNA) capabilities,
      determine whether the request includes a second address,
      map the second address to the first address when the request includes the second address,
      generate a response to the request,
         the response including the mapping of the second address to the first address, and
      transmit the response to the client device,
         the response allowing the client device to detect a presence of the server device within a single local area network (LAN) by communicating with the router and without the response being transmitted external to the single LAN.

7. The router of claim 6,
   where the first address comprises a Uniform Resource Locator (URL), and
   where the second address comprises an IP address.

8. The router of claim 7, where the request is a Domain Name System (DNS) request and the response is a DNS response.

9. The router of claim 7, where, when receiving the message, the processor is to:
   receive the message, based on a Simple Service Discovery Protocol (SSDP), from the server device,
      the message comprising the first address.

10. The router of claim 9, where the processor is further to:
    receive a second message, based on the SSDP, from a second server device, the message comprising a third address of the second server device,
    store the third address in the memory as information about the second server device, and
    include the third address in the response.

11. The router of claim 7, where the server device provides a service to the client device.

12. One or more non-transitory computer-readable media storing instructions, the instructions comprising:
    one or more instructions that, when executed by one or more processors of a router, cause the one or more processors to:
       receive a message from a server device;
       store information about the server device based on the message;
       intercept a Domain Name System (DNS) request from a client device in a User Datagram Protocol (UDP) port number fifty-three of the router,
          the DNS request comprising a first address,
          the router, the server device, and the client device, being located within a single local area network (LAN), and
          the client device not having Digital Living Network Alliance (DLNA) capabilities;
       determine that the first address is associated with the server device based on the information; and
       transmit, to the client device, a second address of the server device, the second address allowing the client device within the single LAN to detect a presence of the server device within the single LAN by communicating with the router within the single LAN and without the DNS request being transmitted external to the single LAN.

13. The one or more non-transitory computer-readable media of claim 12,
where the first address comprises a Uniform Resource Locator (URL),
where the information comprises the second address, and
where the second address comprises an IP address.

14. The one or more non-transitory computer-readable media of claim 12, where the message is based on a Simple Service Discovery Protocol (SSDP).

15. The one or more non-transitory computer-readable media of claim 12, where the single LAN is a single home network.

16. The one or more non-transitory computer-readable media of claim 15, where the instructions further comprise:
one or more instructions that, when executed by the one or more processors of, cause the one or more processors to:
receive a second DNS request from the client device, where the second DNS request comprises a URL; and
transmit the second DNS request outside of the single home network when the URL is not associated with any server within the single home network.

17. The one or more non-transitory computer-readable media of claim 12,
where the message comprises an Internet protocol (IP) address of the server device, and
where the information is the IP address.

18. The one or more non-transitory computer-readable media of claim 12, where the one or more instructions to determine that the first address is associated with the server device comprise:
one or more instructions that, when executed by the one or more processors of the router, cause the one or more processors to:
determine that the first address matches a proxy name associated with server devices within the single LAN, and
retrieve the second address of the server devices based on determining that the first address matches the proxy name.

19. The one or more non-transitory computer-readable media of claim 12,
where the message comprises the first address, and
where the instructions further comprise:
one or more instructions that, when executed by the one or more processors of the router, cause the one or more processors to:
store, based on the message, the first address in a memory of the router before intercepting the DNS request.

* * * * *